United States Patent
Kitada et al.

(10) Patent No.: US 8,373,671 B2
(45) Date of Patent: Feb. 12, 2013

(54) TOUCH SCREEN DEVICE

(75) Inventors: Takashi Kitada, Fujuoka (JP); Haruhiko Kohno, Fukuoka (JP); Yuuji Toyomura, Fukuoka (JP)

(73) Assignee: Panasonic Corporation, Osaka (JP)

( * ) Notice: Subject to any disclaimer, the term of this patent is extended or adjusted under 35 U.S.C. 154(b) by 298 days.

(21) Appl. No.: 12/965,031

(22) Filed: Dec. 10, 2010

(65) Prior Publication Data

US 2011/0148810 A1    Jun. 23, 2011

(30) Foreign Application Priority Data

Dec. 17, 2009  (JP) ................................ 2009-286380
Dec. 17, 2009  (JP) ................................ 2009-286385

(51) Int. Cl.
    G09G 5/00    (2006.01)
(52) U.S. Cl. ...................... 345/173; 345/174; 178/18.06
(58) Field of Classification Search .......... 345/173–179; 178/18.01–18.09
    See application file for complete search history.

(56) References Cited

U.S. PATENT DOCUMENTS

| 2008/0040079 A1 | 2/2008 | Hargreaves |
| 2008/0157893 A1 | 7/2008 | Krah |

FOREIGN PATENT DOCUMENTS

| GB | 2450396 | 12/2008 |
| JP | 5-324163 | 12/1993 |
| JP | 6-332603 | 12/1994 |
| JP | 2002-342033 | 11/2002 |
| JP | 2006-106853 | 4/2006 |
| JP | 2008-158876 | 7/2008 |
| JP | 2009-85635 | 4/2009 |
| JP | 2009-086855 | 4/2009 |
| JP | 2009-134354 | 6/2009 |

OTHER PUBLICATIONS

Japan Office action, mail date is Oct. 4, 2011.
Search report from United Kingdom, mail date is Apr. 15, 2011.
United Kingdom Search Report in GB1020855.1, dated Nov. 11, 2011.

*Primary Examiner* — Regina Liang
(74) *Attorney, Agent, or Firm* — Greenblum & Bernstein, P.L.C.

(57) ABSTRACT

Touch positions can be detected with a high accuracy. A receiver receives a charge-discharge current signal of a receiving electrode in response to a drive (pulse) signal applied to a transmission electrode, and outputs a level signal of each electrode intersection. The receiver includes an IV converter that converts the charge-discharge current signal to a voltage signal. A conversion characteristic of the IV converter is set such that phases of amplitude of the voltage signal corresponding to a leading edge and a trailing edge of a pulse wave of the drive signal substantially match each other, and phases of amplitude of the voltage signal corresponding to the trailing edge of the pulse wave and a leading edge of a succeeding pulse wave substantially match each other.

15 Claims, 9 Drawing Sheets

TOUCH SCREEN DEVICE

CROSS-REFERENCE TO RELATED APPLICATIONS

The present application claims priority under 35 U.S.C. §119 of Japanese Application Nos. 2009-286380 and 2009-286385, both filed on Dec. 17, 2009, the disclosures of which are expressly incorporated by reference herein in their entirety.

BACKGROUND OF THE INVENTION

1. Field of the Invention

The present invention relates to a mutual-capacitance, projected-capacitive touch screen device that determines whether or not a touch is present based on an amount of change in a charge-discharge current at each intersection of electrodes arranged in a grid pattern.

2. Description of Related Art

There are various types of touch screen devices. A capacitive touch screen device does not require an electronic pen including an oscillator or the like, and a touch operation on the capacitive touch screen device can be performed directly with a finger tip of a user or with a stylus simply made of a conductive material.

A projected capacitive touch screen device includes first electrodes and second electrodes arranged in a grid pattern, and uses a principle that capacitance of a capacitor provided at each intersection (hereinafter, referred to as an electrode intersection) of the first electrodes and the second electrodes varies with a close access or a contact of a conductive object (e.g., human body).

A mutual-capacitance, projected-capacitive touch screen device detects whether a touch is present based on an amount of change in the charge-discharge current according to the change in capacitance at each electrode intersection, It is possible to perform multi-touch (or multipoint detection), which detects a plurality of touch positions simultaneously, in the mutual-capacitance, projected-capacitive touch screen device (see Related Art 1).

The touch screen device is widely used in fields of personal computers or handheld terminals. On the other hand, a technology is known in which the touch screen device is used as an interactive whiteboard, by combining the touch screen device with a large screen display device to be used in a presentation or a lecture for a large audience (see Related Art 2).

Related Art 1: Japanese Patent Application Publication No. 2002-342033

Related Art 2: Japanese Patent Application Publication No. 2009-86855

SUMMARY OF THE INVENTION

When the mutual-capacitance, projected-capacitive touch screen device is used as an interactive whiteboard, overall capacitance between the first electrodes and the second electrodes increases, as the size of the touch screen device increases. For example, the capacitance exceeds 100 pF in the device having a 77 inch screen. On the other hand, the change in capacitance in accordance with a touch operation by a user's finger tip or a stylus is at most several 100 fF, and thus is very small. Accordingly, as the size of the touch screen device increases, a sufficient detection accuracy cannot be secured.

In view of the above circumstances, the present invention provides a touch screen device configured to detect touch positions with a high accuracy, even when the size of the touch screen device is increased.

A touch screen device according to the present invention includes a plurality of first electrodes extending in parallel to each other; a plurality of second electrodes extending in parallel to each other, the first electrodes and the second electrodes being arranged in a grid pattern; a transmitter that applies a drive signal to each of the first electrodes; a receiver that receives a charge-discharge current signal from each of the second electrodes in response to the drive signal applied to each of the first electrodes, and outputs a level signal at each intersection between the first electrodes and the second electrodes; and a controller that detects a touch position based on the level signal output from the receiver. The receiver includes an IV converter that converts the charge-discharge current signal to a voltage signal. A conversion characteristic of the IV converter is set such that phases of amplitude of the voltage signal corresponding to a leading edge and a trailing edge of a pulse wave of the drive signal substantially match each other, and phases of amplitude of the voltage signal corresponding to the trailing edge of the pulse wave and a leading edge of a succeeding pulse wave substantially match each other.

According to the present invention, waveforms of the voltage signal corresponding to the leading edge and the trailing edge of a wave overlap each other. Further, waveforms of the voltage signal corresponding to the trailing edge of the wave and the leading edge of an immediately succeeding wave overlap each other. Therefore, a substantially amplified waveform can be obtained. Accordingly, even if the overall capacitance between the first electrodes and the second electrodes increases along with the increase in the size of the touch screen device, a touch position can be detected with a high accuracy.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Embodiments of the present invention will be described hereinafter with reference to the drawings.

Figure 1:
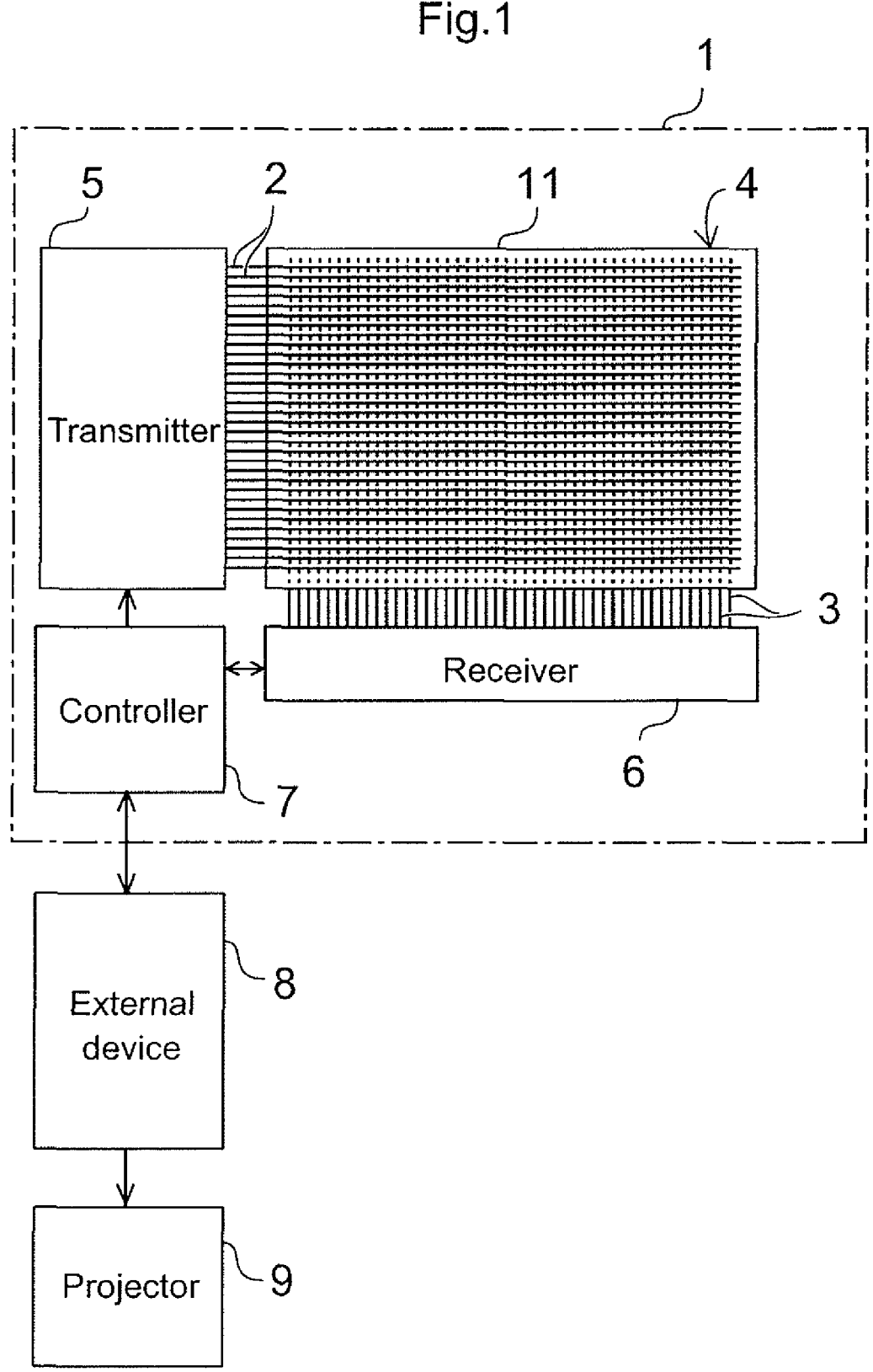
FIG. 1 is a configuration diagram illustrating an entire touch screen device according to an embodiment of the present invention.

(First Embodiment) FIG. 1 is a configuration diagram illustrating an entire touch screen device according to an embodiment of the present invention. The touch screen device 1 includes a panel body 4, in which a plurality of transmission electrodes (first electrodes) 2 extending parallel to each other and a plurality of receiving electrodes (second electrodes) 3 extending parallel to each other are arranged in a grid pattern; a transmitter 5 that applies a drive signal (pulse signal) to the transmission electrode 2; a receiver 6 that receives a charge-discharge current signal of the receiving electrode 3 in response to the drive signal applied to the transmission electrode 2, and outputs a level signal of each electrode intersection, at which the transmission electrode 2 intersects with the receiving electrode 3; and a controller 7 that detects a touch position based on the level signal output from the receiver 6, and controls operations of the transmitter 5 and the receiver 6.

The touch screen device 1, combined with a large screen device, is used as an interactive whiteboard, which can be used in a presentation or a lecture. In particular, in this embodiment, the touch screen device is used in combination with a projector device, and a touch surface of the touch screen device 1 is used as a screen for a projector.

Touch position information output from the touch screen device 1 is input to an external device 8, such as a personal computer, etc. An image corresponding to a touch operation performed on a touch surface of the touch screen device 1, directly with a user's finger tip or with a stylus, is displayed on a display screen, which is projected and displayed on the touch surface of the touch screen device 1 by a projector device 9, based on display screen data output from the external device 8. Thus, a desired image can be displayed in a feeling similar to when the image is directly drawn on the touch surface of the touch screen device 1 by a marker. Further, a button displayed in the display screen can be operated. Moreover, an eraser, which erases the image drawn through a touch operation, can also be used.

In the panel body 4, a plurality of transmission electrodes (e.g., 120 receiving electrodes) 2 are arranged on a front surface of a sheet member 11, and a plurality of receiving electrodes (e.g., 186 transmission electrodes) 3 are arranged on a rear surface of the sheet member 11. The transmission electrodes 2 and the receiving electrodes 3 are arranged at a same pitch (e.g., 10 mm).

Further, in the panel body 4, a back board is provided on a back surface side of an electrode sheet, which is made of the transmission electrodes 2, the receiving electrodes 3, and the sheet member 11. The back board supports the electrode sheet. A front board is provided on a (front) surface side of the electrode sheet. The front board protects the electrode sheet. It is sufficient that the transmission electrode 2 and the receiving electrode 3 are insulated from each other. Therefore, for example, both may be provided on the (front) surface side of the sheet member 11 with an insulation layer therebetween.

In the panel body 4, a capacitor is formed at an electrode intersection at which the transmission electrode 2 intersects with the receiving electrode 3. When a user performs a touch operation directly with the user's finger tip or with a stylus, capacitance at the electrode intersection is substantially reduced in response to the touch operation, and thereby it is possible to detect whether or not a touch operation is performed.

In particular, in this embodiment, a mutual capacitance touch screen device is used. Thus, when a drive signal is applied to the transmission electrode 2, a charge-discharge current flows in the receiving electrode 3 in response to the drive signal. At this moment, when capacitance at an electrode intersection changes in response to a user's touch operation, the charge-discharge current in the receiving electrode 3 also changes. The receiver 6 converts an amount of change in the charge-discharge current into a level signal (digital signal) of each electrode intersection, and outputs the level signal to the controller 7. The controller 7 calculates a touch position based on the level signal of each electrode intersection. In the mutual capacitance touch screen device, it is possible to perform multi-touch (or multipoint detection), which detects a plurality of touch positions simultaneously.

The transmitter 5 selects the transmission electrodes 2 one by one and applies a drive signal to the selected electrode, in synchronization with a timing signal output from the controller 7. While the drive signal is applied to one transmission electrode 2, the receiver 6 selects the receiving electrodes 3 one by one, and receives the charge-discharge current from the selected receiving electrode 3. By doing so, a charge-discharge current of each and every electrode intersection can be obtained. For example, when a frame period, in which a receipt of the charge-discharge currents for all the electrode intersections (186×120=22320) is completed, is 10 ms, a drive signal output period for each of the 120 transmission electrodes 2 is about 83 μs.

The controller 7 obtains a touch position (a central coordinate of a touch area) from the level signal of each electrode intersection output from the receiver 6, using a predetermined operation. In the calculation of the touch position, the touch position is obtained from level signals of a plurality of electrode intersections (e.g., 4×4), which are adjacent to each other in the x-axis direction (the direction in which the transmission electrode 2 extends) and in the y-axis direction (the direction in which the receiving electrode 3 extends), by using a desired interpolating method (e.g., centroid method). Thus, it is possible to detect a touch position with a resolution (e.g., equal to or less than 1 mm) higher than the pitch (10 mm) of transmission electrodes 2 and the receiving electrodes 3.

Figure 2:
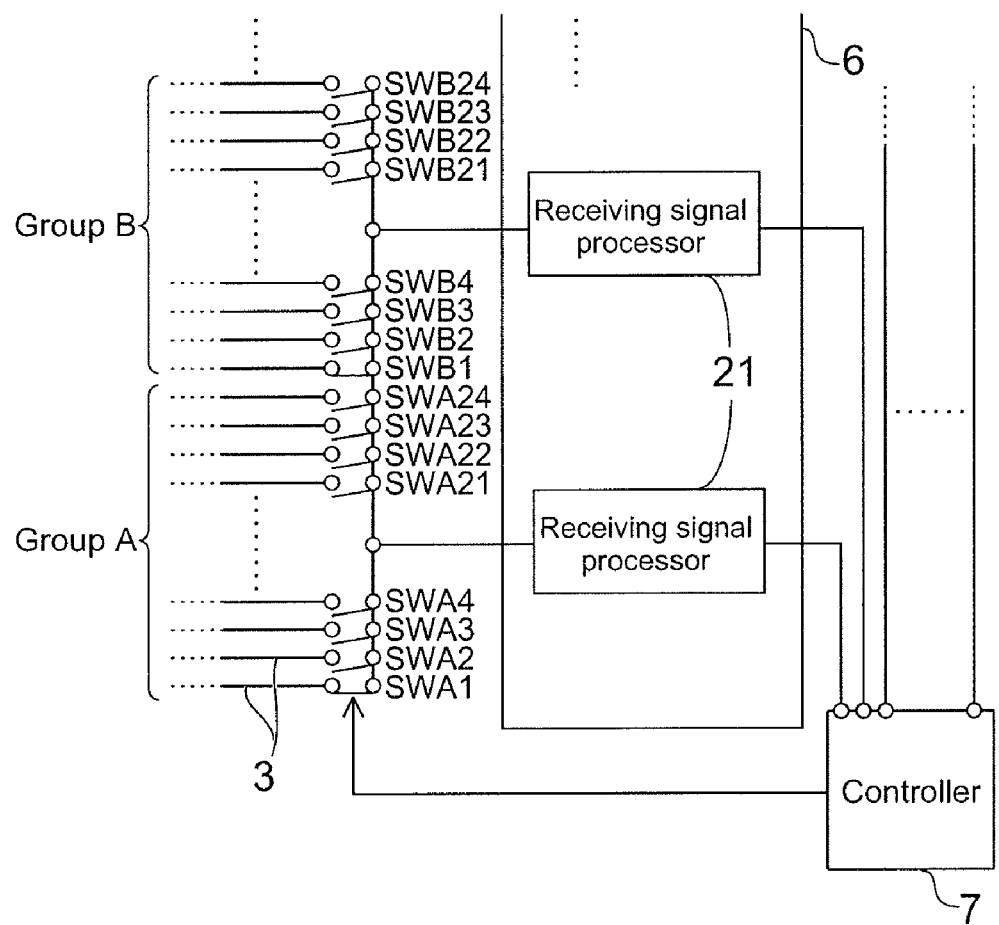
FIG. 2 is a schematic configuration diagram illustrating receiving electrodes and a receiver shown in FIG. 1.

FIG. 2 is a schematic configuration diagram illustrating the receiving electrodes 3 and the receiver 6 shown in FIG. 1. Each receiving electrode 3 is connected to a switching element (switch) SW, that switches an input of the charge-discharge current signal from the receiving electrode 3 to the receiver 6. The receiver 6 includes a receiving signal processor 21 that applies desired signal processing to the charge-discharge current signal input from the receiving electrode 3 via the switching element SW. On-off control is independently performed for each switching element SW, in accordance with a drive signal from the controller 7.

The receiving electrodes 3 and the switching elements SW are grouped together every predetermined number (e.g., 24), and on-off control of mutually corresponding switching elements SW included in respective groups is concurrently performed. Further, a receiving signal processor 21 is provided for each group. In each group, the switching elements SW are controlled to be turned ON one by one. The rest of the switching elements SW are controlled to remain OFF. The charge-discharge current signal of the single receiving electrode 3, selected by turning ON the corresponding switching element SW, is input to the receiving signal processor 21.

Thus, since the switching operations of the switching elements SW are concurrently performed for the plurality of groups, a period of time necessary to receive the charge-discharge current signals from all of the receiving electrodes 3 can be reduced. Further, since the processing of the charge-discharge current signals at the receiver 6 can be individually performed for each group, an increase in size of the hardware configuration can be reduced.

Further, in the grouping of the receiving electrodes 3, the number of receiving electrodes 3 in each group is not required to be the same. For example, when the total number of the receiving electrodes 3 is 186, each of seven groups A-G may include twenty four (24) electrodes, and the last group H may include 18 electrodes.

Figure 3:
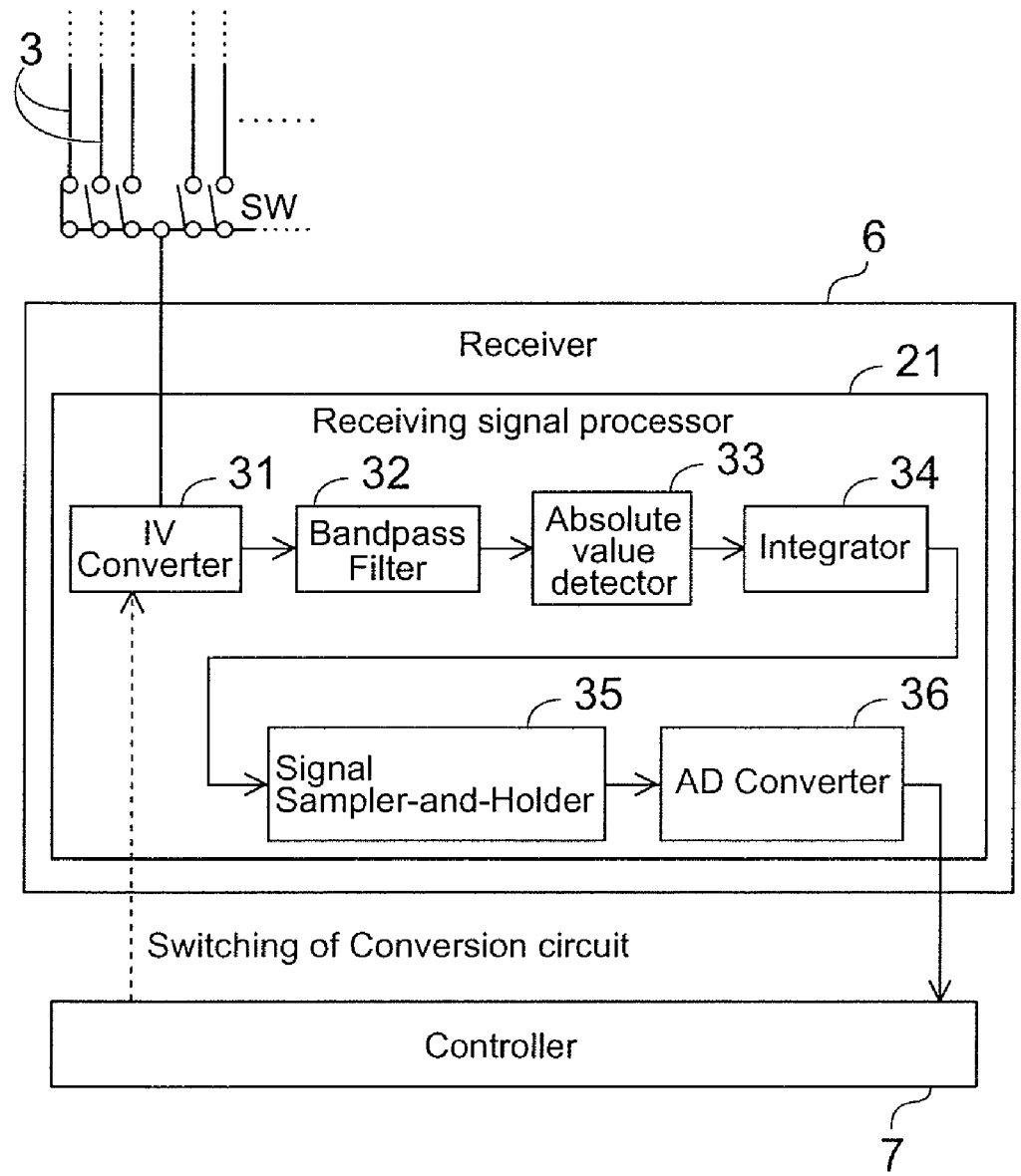
FIG. 3 is a schematic configuration diagram illustrating a receiving signal processor shown in FIG. 2.

FIG. 3 is a schematic configuration diagram illustrating the receiving signal processor 21 shown in FIG. 2. The receiving signal processor 21 includes an IV (current-to-voltage) converter 31, a bandpass filter 32, an absolute value detector 33, an integrator 34, a signal sampler-and-holder 35 and an AD converter 36.

The IV converter 31 converts the charge-discharge current signal (analog signal) of the receiving electrode 3, input through the switching element SW, into a voltage signal. The bandpass filter 32 performs an operation to remove a signal having a frequency component other than the frequency of the drive signal applied to the transmission electrode 2, from the output signals from the IV converter 31. The absolute value detector (rectifier) 33 applies a full-wave rectification to the output signals from the bandpass filter 32. The integrator 34 performs an operation to integrate the output signal from the absolute value detector 33 along the time axis. The signal sampler-and-holder 35 performs an operation to sample the output signal from the integrator 34 at a predetermined time. The AD converter 36 performs an AD conversion of the output signal from the signal sampler-and-holder 35, and outputs a level signal (digital signal).

Figure 4A:
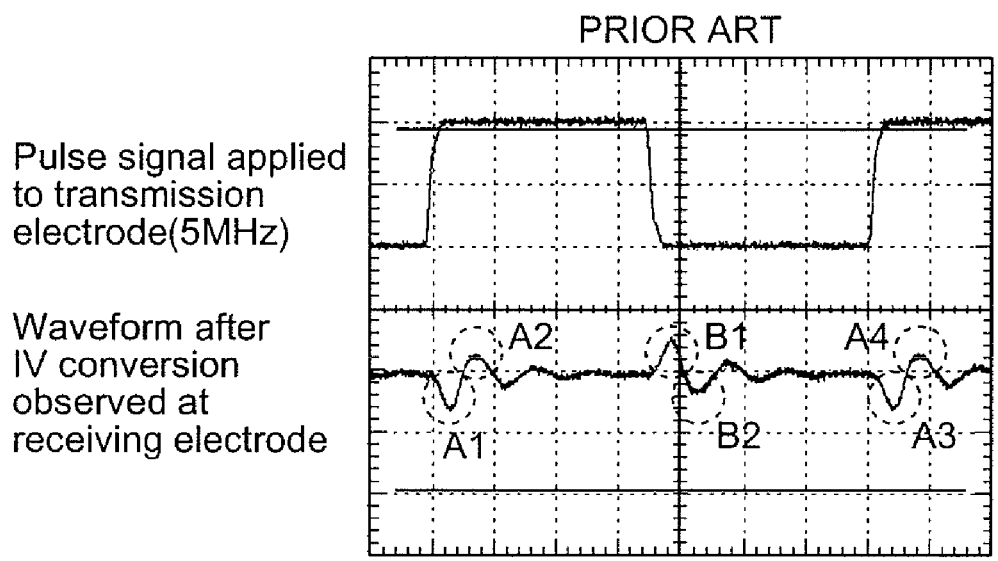
FIGS. 4A and 4B are waveform diagrams, each illustrating a drive signal applied to a transmission electrode shown in FIG. 1, and a voltage signal output from an IV converter shown in FIG. 3.
Figure 4B:
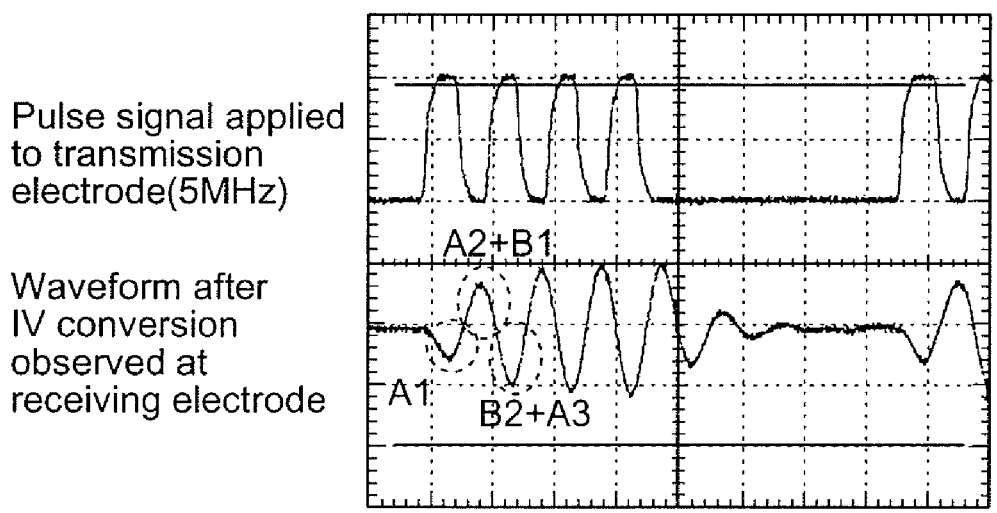

FIGS. 4A and 4B are waveform diagrams, each illustrating a drive signal applied to the transmission electrode 2 shown in FIG. 1, and a voltage signal output from the IV converter 31 shown in FIG. 3. FIG. 4A shows signals in the conventional art, and FIG. 4B shows signals in the embodiment of the present invention. For the convenience, FIG. 4A is magnified by roughly 7 times with respect to FIG. 4B along the time axis.

Ordinarily, when a drive signal (pulse signal) is applied to the transmission electrode 2, waveforms A1 and A3, each caused by a charge of a capacitor at an electrode intersection, appear at leading edges of the pulse wave, as shown in FIG. 4A, and then, as their transient responses, waveforms A2 and A4, each caused by a discharge of the capacitor at the electrode intersection, appear. Further, small waveforms that gradually attenuate appear thereafter. In addition, waveform B1, caused by a discharge of the capacitor at the electrode intersection appears at the trailing edge of the pulse wave, and then, as its transient response, a waveform B2, caused by a charge of the capacitor at the electrode intersection, appears. A small waveform that gradually attenuates further appears thereafter.

In the conventional are, when a touch operation is performed, since the capacitance of the capacitor at the electrode intersection decreases, an amplitude of the voltage signal output from the IV converter 31 also decreases. Accordingly, it is possible to determine whether a touch operation is performed based on the change in a wave height value (amplitude). However, in this embodiment, whether or not a touch operation is performed, is determined based on a value obtained through integration after a full-wave rectification, i.e., based on an integrated value of an area of a waveform. Accordingly, it is possible to perform the above-described determination with a high accuracy, by increasing the number of pulses of each electrode intersection, even based on a small change in amplitude.

However, in this embodiment, since the touch screen device 1 is used as an interactive whiteboard, overall capacitance between the transmission electrodes 2 and the receiving electrodes 3 increases, as the size of the touch screen device 1 increases. Accordingly, the change in capacitance caused by a touch operation with respect to the overall capacitance becomes extremely small, and thus, the amplitude of the voltage signal is barely decreased when the touch operation occurs, so the device becomes easily affected by an exogenous (external) noise. Accordingly, in order to securely detect a touch position with a high accuracy, the number of pulses per electrode intersection must be increased.

Therefore, in this embodiment, conversion characteristics are set such that the IV converter 31 substantially matches the phases of amplitude of the voltage signal, which are output from the IV converter 31 respectively corresponding to a leading edge and a trailing edge of a single pulse wave in a drive signal (pulse signal) applied to the transmission electrode 2 from the transmitter 5, and also generally matches the phases of amplitude of the voltage signals corresponding to the trailing edge of the single pulse wave and a leading edge of an immediately succeeding pulse wave.

In other words, the waveform A2 generated by a discharge (transient response) at the leading edge of a pulse wave overlaps the waveform B1 generated by a discharge at the trailing edge of the same pulse wave. Further, the waveform B2 generated by a charge (transient response) at the trailing edge of the pulse wave overlaps the waveform A3 generated by a charge at the leading edge of an immediately succeeding pulse wave. Such conversion characteristics can be achieved by adjusting a time constant (a value for adjusting timing of charges and discharges) of a conversion circuit of the IV converter 31.

By doing so, as shown in FIG. 4B, a substantively amplified waveform can be obtained. Accordingly, the amplitude of the voltage signal largely increases when the touch operation is present, so, even if the overall capacitance between the transmission electrode 2 and the receiving electrode 3 increases, along with the increase in the size of the touch screen device 1, a touch position can be detected with a high accuracy without increasing the number of pulses per electrode intersection.

As described above, the phases of amplitude are substantially matched, the frequency of the voltage signal output from the IV converter 31 matches the frequency of the drive signal applied to the transmission electrode 2. The receiving signal processor 21 includes the bandpass filter 32 in a stage subsequent to the IV converter 31 to remove a signal having a frequency component other than the frequency of the drive signal applied to the transmission electrode 2. Thus, even when an exogenous noise is mixed in, the bandpass filter 32 can remove such a noise, if the frequency of the noise is substantially different from the frequency of the drive signal applied to the transmission electrode 2. However, at this time, when an exogenous noise having a frequency substantially matching the frequency of the drive signal is mixed in, the bandpass filter 32 cannot remove such a noise. Accordingly, it may become difficult to detect an accurate touch position. More specifically, the detected touch positions (coordinate values) become neither consistent nor continuous, and the touch positions randomly change. Thus, false detection of a touch position may occur.

Accordingly, in this embodiment, the transmitter 5 is configured such that the frequency of the drive signal is switchable among multiple frequencies. Further, the IV converter 31 is configured such that the conversion characteristics are switchable among the multiple conversion characteristics (time constants) respectively corresponding to the multiple frequencies of the drive signal. The controller 7 controls the IV converter 31 to switch the conversion characteristics in accordance with the switching of the frequency of the drive signal.

By doing to, when the frequency of the exogenous noise substantially matches one of the frequencies of the drive signal, the frequency of the drive signal is switched to another frequency, thereby changing the frequency of the voltage signal, which is the same as the frequency of the drive signal of the transmission electrode 2, to be different from the frequency of the exogenous noise. Therefore, the exogenous noise can be securely eliminated by using a bandpass filter that cuts a frequency component different from the frequency of the drive signal of the transmission electrode 2. As a result, it is possible to avoid reduction in detection accuracy of the touch position caused by an influence of the exogenous noise.

In particular, in this embodiment, the drive signal applied to the transmission electrode 2 by the transmitter 5 is switchable between a first frequency (e.g., 5 MHz) and a second frequency (e.g., 3 MHz). Further, as described below, the IV converter 31 is configured such that the conversion characteristics are switchable between a first conversion characteristic, which corresponds to the first frequency, and a second conversion characteristic, which corresponds to the second frequency.

Figure 5:
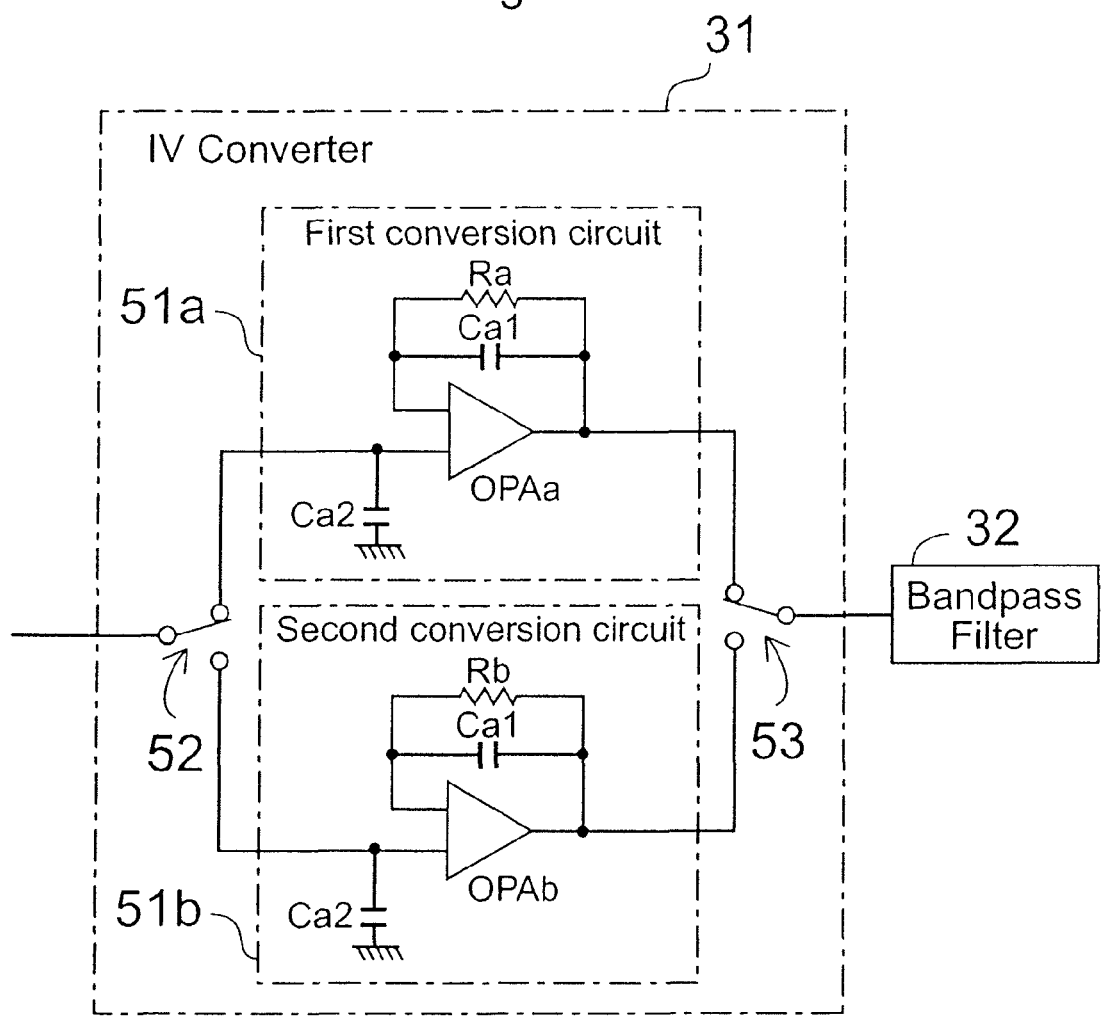
FIG. 5 is a circuit diagram illustrating a detailed configuration of the IV converter shown in FIG. 3.

FIG. 5 is a circuit diagram illustrating a detailed configuration of the IV converter 31 shown in FIG. 3. The IV converter 31 includes a first conversion circuit 51a and a second conversion circuit 51b, which respectively have two conversion characteristics different from each other, and an input switch 52 and an output switch 53, which select one of the conversion circuits 51a and 51b.

The first conversion circuit 51a includes an operational amplifier OPAa, a resistance component Ra, a first capacitance component Ca1 and a second capacitance component Ca2. The resistance component Ra and the first capacitance component Ca1 are connected in parallel between one of the two inputs of the operational amplifier OPAa and an output of the operational amplifier OPAa. The second capacitance component Ca2 is connected to the other of the two inputs of the operational amplifier OPAa, and is grounded. The second conversion circuit 51b includes an operational amplifier OPAb, a resistance component Rb1, a first capacitance component Cb1 and a second capacitance component Cb2. The second conversion circuit 51b has a circuit configuration same as that of the first conversion circuit 51a.

In the first conversion circuit 51a and the second conversion circuit 51b, the resistance components Ra and Rb corresponding to each other are set to have different resistance values. The first capacitance components Ca1 and Cb1 are set to have different capacitance values. Further, the second capacitance components Ca2 and Cb2 are set to have different capacitance values. As a result, the first conversion circuit 51a and the second conversion circuit 51b have different time constants.

In the conversion circuits 51a and 51b, it is not necessary to set different resistance values or different capacitance values between every corresponding components. The resistance values and the capacitance values may be set appropriately so that desired time constants are obtained. Further, it is possible to set the resistance value or the capacitance value to zero (0). For example, the capacitance of the second capacitance component Ca2 of the first conversion circuit 51a may be set to zero (0).

Here, the first conversion circuit 51a is set to have the first conversion characteristic corresponding to the first frequency (e.g., 5 MHz) of the drive signal. In other words, the time constant is adjusted such that the amplification generated by matching the phases of amplitude, as shown in FIG. 4B, is achieved at the first frequency. The second conversion circuit 51b is set to have the second conversion characteristic corresponding to the second frequency (e.g., 3 MHz) of the drive signal. In other words, the time constant is adjusted such that the amplification generated by matching the phases of amplitude, as shown in FIG. 4B, is achieved at the second frequency.

The controller 7 switches between the first conversion circuit 51a and the second conversion circuit 51b in accordance with switching of frequencies of the drive signal applied to the transmission electrode 2. In other words, when the drive signal has the first frequency, the conversion circuit 51a is selected. When the drive signal has the second frequency, the second conversion circuit 51b is selected.

In particular, the controller 7 performs a control operation to switch the frequency of the drive signal applied to the transmission electrodes 2 by the transmitter 5 and the conversion characteristics of the IV converters 31, at a frame period, in which a receipt of a charge-discharge current for all the electrode intersections is completed. In this embodiment, only two frequencies of the drive signal, including the first frequency and the second frequency, are provided. Accordingly, at a frame period, the frequency of the drive signal is switched alternately between the first frequency and the second frequency, and the first conversion circuit and the second conversion circuit of the IV converter are alternately switched from one to another. However, more than two frequencies can be provided.

As described above, since the frequencies of the drive signal applied to the transmission electrode 2 are periodically switched from one to another, even when exogenous noises having a variety of frequencies are mixed in, the influence of the exogenous noise can be eliminated. Further, even when only two switchable frequencies are provided, there is an extremely low possibility that both of the two switchable frequencies match the frequencies of exogenous noises. Thus, it is possible to secure sufficient reliability.

Further, the controller 7 determines the validity of touch positions based on the degree of variation in touch positions obtained in a frame unit. When the degree of variation in the touch positions is large, more specifically, when the degree of variation exceeds a predetermined threshold value, it is determined that an influence of exogenous noises is present, and thus the touch position information is discarded. In this embodiment, the touch position information is discarded in a frame unit. Therefore, the sampling rate is consequently reduced to one half. However, when the frame period is set sufficiently small, a sufficient reliability can be secured.

When exogenous noises are not mixed in, a common touch position is detected regardless of the difference in the frequency of the drive signal applied to the transmission electrode 2. Accordingly, periodical switching of frequencies does not usually cause any adverse effect.

In addition, in the above-described embodiment, the frequencies of the drive signal applied to the transmission electrode 2 are periodically switched from one to another, regardless of whether the influence of exogenous noise is present. However, it is possible to perform the switching operation of the frequencies, when it is determined that the influence of exogenous noise is present. For example, an initial operation may be set to be performed with the first frequency (e.g., 5 MHz), and then the frequency may be switched to the second frequency (e.g., 3 MHz), when the degree of variation in the detected touch positions is determined to be large, based upon a comparison with a predetermined threshold value.

Further, the influence of exogenous noise is recognized even without user's touch operations. When exogenous noises that cannot be eliminated by the bandpass filter 32 are mixed in, the level signal output from the receiver 6 becomes unstable. Therefore, it is also possible to determine whether or not the influence of exogenous noises is present using the stability of the level signal, and a switching operation of the frequency of the drive signal and the conversion characteristics of the IV converter may be performed based on the result of the determination. In this case, since it does not matter whether or not a touch operation is performed, the noise determining operation may be performed during calibration, which is performed at the time of a start-up of the device.

Thus, the touch screen device according to the features of the present invention has an advantageous effect that a touch position can be detected with a high accuracy, even when the size of the device is increased. Thus, the touch screen device according to the features of the present invention is useful as a touch screen device including a receiver provided with an IV converter. The receiver receives a charge-discharge current signal of the second electrode in response to the drive signal applied to the first electrode, and outputs a level signal of each electrode intersection. The IV converter converts the charge-discharge current signal of the second electrode into a voltage signal.

(Second Embodiment) Next, a second embodiment of the present invention will be described hereinafter with respect to the drawings.

Figure 6:
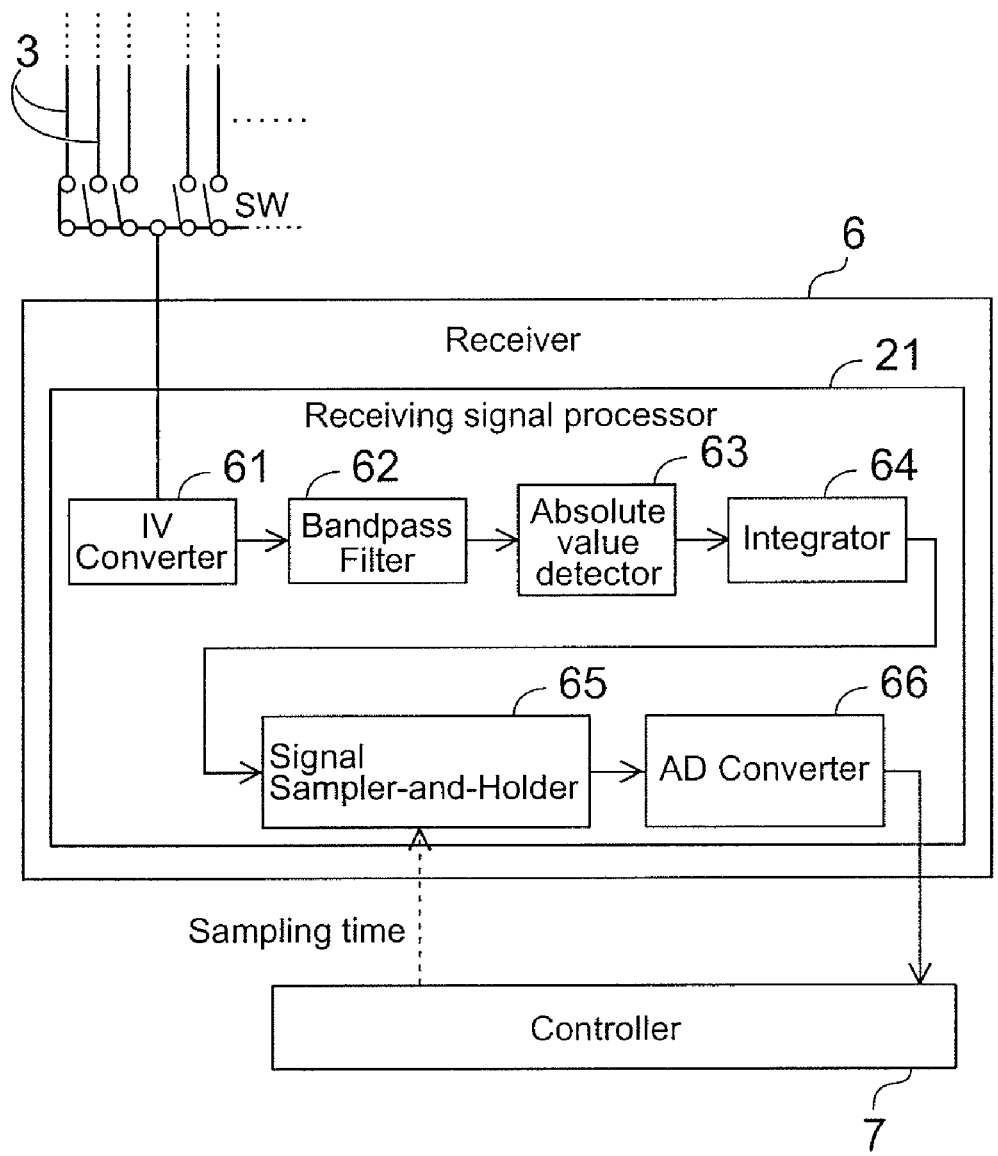
FIG. 6 is a schematic configuration diagram illustrating the receiving signal processor shown in FIG. 2.

FIG. 6 is a schematic configuration diagram illustrating the receiving signal processor 21 shown in FIG. 2. The receiving signal processor 21 includes an IV converter 61, a bandpass filter 62, an absolute value detector 63, an integrator 64, a signal sampler-and-holder 65 and an AD converter 66.

The IV converter 61 converts a charge-discharge current signal (analog signal) of the receiving electrode 3, input through the switching element SW, into a voltage signal. The bandpass filter 62 performs an operation to eliminate a signal having a frequency component other than the frequency of the drive signal applied to the transmission electrode 2, from the signal output from the IV converter 61. The absolute value detector (rectifier) 63 performs a full-wave rectification to the output signals from the bandpass filter 62. The integrator 64 applies an operation to integrate the output signal from the absolute value detector 63 along the time axis. The signal sampler-and-holder 65 performs an operation that samples the output signal from the integrator 64. The AD converter 66 performs an AD conversion of the output signal from the signal sampler-and-holder 65, and outputs a level signal (digital signal).

Figure 7:
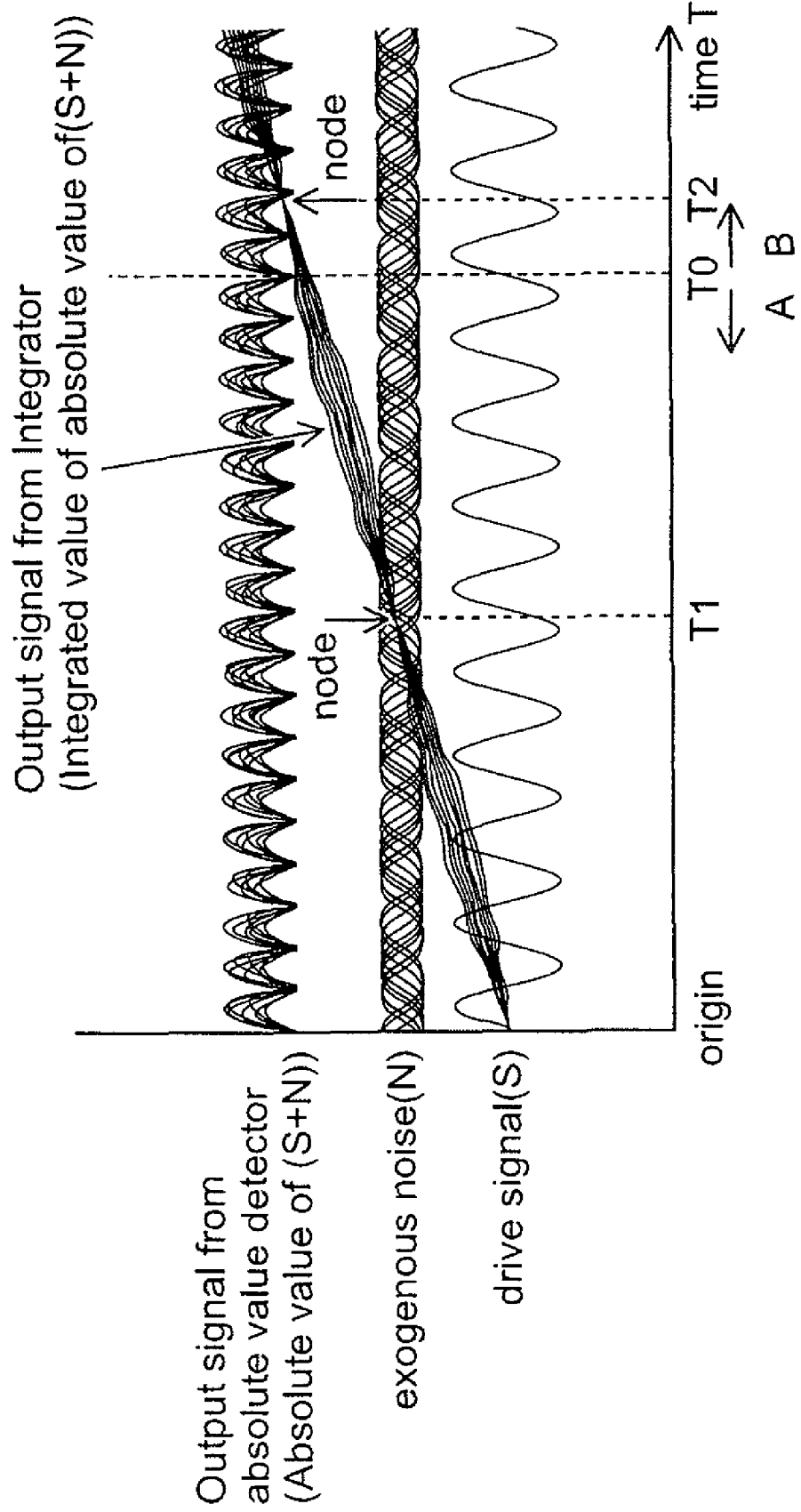
FIG. 7 is a diagram illustrating a manner of a sampling time setting in a signal sampler-and-holder shown in FIG. 6.

FIG. 7 is a diagram illustrating a manner of a sampling time setting in the signal sampler-and-holder 65 shown in FIG. 6. This is an example based upon a simulation. In this example, the drive signal applied to the transmission electrode 2 forms a sine wave. However, an actual drive signal forms a pulse wave. Further, the phases of the exogenous noises are assumed to change randomly.

Since the output signals of the absolute value detector 63 is integrated along the time axis, the output signal of the integrator 64 gradually increase as time passes, and randomly changes due to the influence of exogenous noises. Accordingly, for example, when sampling is performed at a sampling time T0, the output signal of the signal sampler-and-holder 65 varies, and thus, a stable output signal cannot be obtained.

However, in the output signal of the integrator 64, a node, at which the degree of variation is minimized, appears when the drive signal cycle and the exogenous noise cycle have a common multiple. Therefore, by performing sampling at or around the time (time points T1 and T2) when the node appears, the variation in the output signal of the signal sampler-and-holder 65 can be minimized, and thus, a stable output signal, which is not affected by exogenous noises, can be obtained.

Accordingly, in this embodiment, the controller 7 detects the degree of variation in the level signal output from the receiver 6, and sets the sampling time of the signal sampler-and-holder 65, such that a sampling is performed when the degree of variation is minimized.

Figure 8:
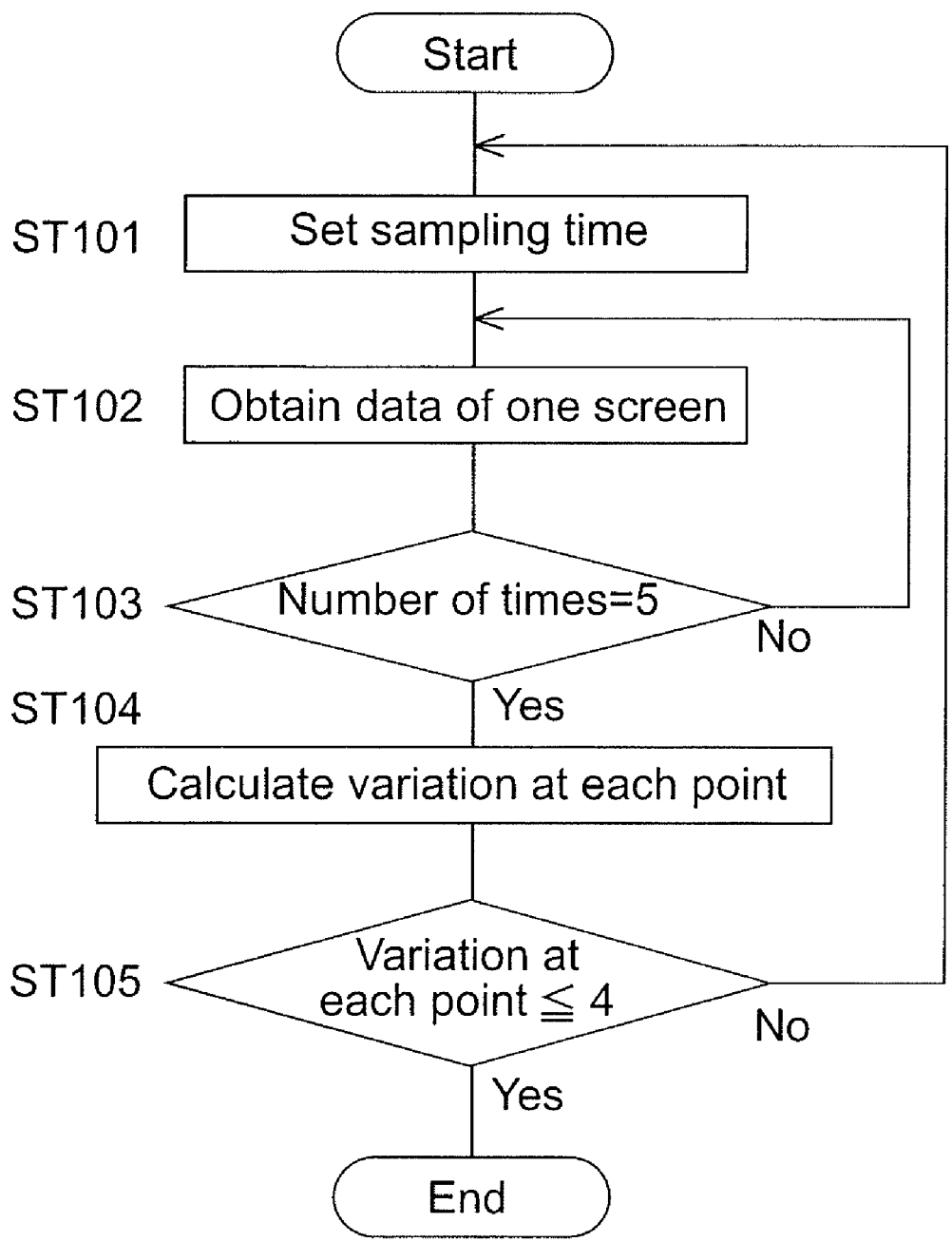
FIG. 8 is a flowchart illustrating a procedure of a sampling time setting process performed by a controller shown in FIG. 6.

FIG. 8 is a flowchart illustrating a procedure of a sampling time setting process performed by the controller 7 shown in FIG. 6. The sampling time setting process is performed during calibration, which is performed at the time of start-up of the device.

Initially, when the device is powered on, the sampling time is set to be an initial value TO (ST101). The signal sampler-and-holder 65 performs a sampling at the sampling time T0, the receiver 6 sequentially outputs level signals of respective electrode intersections, and level signals for one screen are obtained (ST102). This operation is repeated a predetermined number of times, e.g. five (5) times, in this embodiment (ST103). When the number of repetition reaches the predetermined number of times, the degree of variation in the level signals is calculated (ST104). Then, it is determined whether the degree of variation in the level signals is equal to or less than a predetermined reference value, e.g., four (4) in this embodiment (ST105). When the degree of variation is equal to or less than the predetermined reference value, it is determined that there is no influence of exogenous noises, and thus the sampling time remains the initial value T0 and the process ends.

On the other hand, when the degree of variation exceeds the predetermined value (No in ST105), it is determined that there is an influence of exogenous noises, and thus, the sampling time is changed, and the above-described process is repeated until the degree of variation is equal to or less than the predetermined value. At this time, a sampling time at which the degree of variation is minimized is searched for, while the sampling time is gradually changed. For example, as shown in FIG. 7, new sampling times are set temporally before (A direction) and temporally after (B direction) the initial value TO of the sampling time, and the degrees of variation thereof are calculated, respectively. Then, another new sampling time may be set more finely in a direction in which the degree of variation is reduced. In the example shown in FIG. 7, the degree of variation is reduced when the sample time is changed toward B direction. Therefore, further new sampling time is set finely in B direction, and a sampling time at which the degree of variety is reduced is searched.

Accordingly, since the degree of variation in the level signal output from the receiver 6 can be minimized, a stable output signal which is not affected by the exogenous noises can be obtained. As a result, it is possible to avoid reduction in detection accuracy of the touch position due to the influence of the exogenous noises. Further, in order to reduce the influence of the exogenous noises only by the bandpass filter 62, it is necessary to employ the bandpass filter 62 having a steep or precipitous characteristic. However, in this embodiment, since such a high cost bandpass filter having a steep characteristic is not required, reduction in cost can be achieved.

Further, in this configuration, when the frequency of an exogenous noise matches the frequency of the drive signal, no node appears in the output signal of the integrator 64, and thus, the variation in the level signal cannot be reduced. However, since the possibility that the frequency of an exogenous noise matches the frequency of the drive signal is low, a practically sufficient effect can be achieved.

Figure 9:
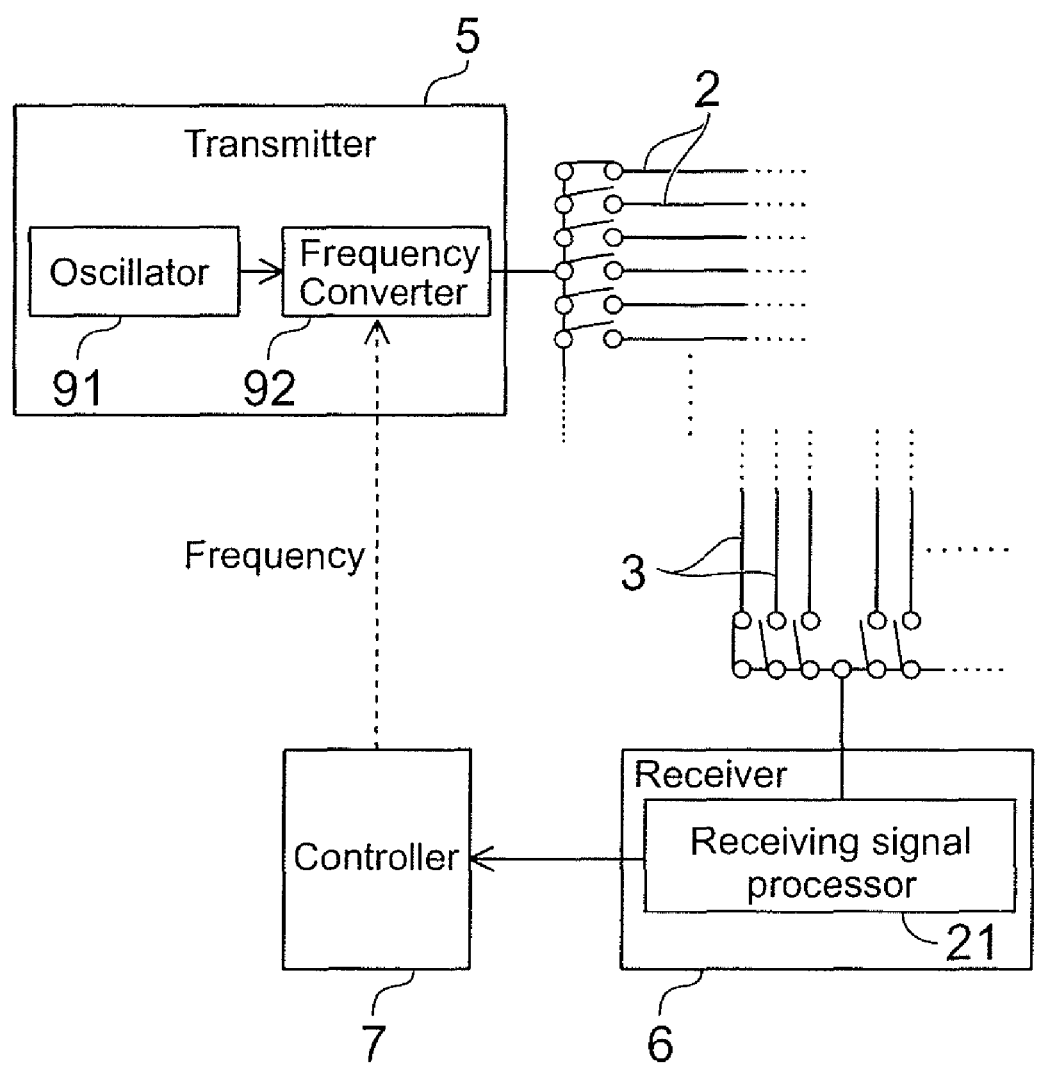
FIG. 9 is a schematic configuration diagram illustrating a touch screen device according to another embodiment of the present invention.

FIG. 9 is a schematic configuration diagram illustrating a touch screen device according to another embodiment of the present invention. In this embodiment, the controller 7 sets the frequency of the drive signal applied to the transmission electrode 2 by the transmitter 5 such that the degree of variation in a level signal value output from the receiver 6 is minimized. The transmitter 5 includes an oscillator 91 and a frequency converter (PLL) 92, so as to be capable of changing the frequency of the drive signal applied to the transmission electrode 2.

The controller 7 may perform an operation according to the procedure similar to the embodiment shown in FIG. 8. However, in this embodiment, instead of the operation (ST101) in which a sampling time is set, an operation to set a frequency of the drive signal is performed. Thus, while the frequency of the drive signal is gradually changed, a frequency at which the degree of variation is minimized is searched for. Since the other aspects of this embodiment is similar to that of the previous embodiment, detailed explanation is omitted by denoting the same components with the same reference numerals.

When the frequency of the drive signal applied to the transmission electrode 2 is changed in this manner, the time at which the node appearing in the output signal of the integrator 64 can be shifted forwards and backwards, as shown in FIG. 8. Thus, the frequency of the drive signal applied to the transmission electrode 2 may be set such that the node appearing in the output signal of the integrator 64 coincides with or is close to a predetermined sampling time.

When the cycle of the drive signal is close to the cycle of an exogenous noise, the time at which a node appears in the output signal of the integrator 64 delays, i.e., the time of common multiple of the cycle of drive signal and the cycle of the exogenous noise delays. Therefore, in the above-described configuration in which the sampling time is changed, the period of time required to obtain the level signal of each electrode intersection increases. As a result, a frame rate decreases. On the other hand, according to the configuration in which the frequency of the drive signal is changed, the sampling time does not need to be changed. Thus, there is an advantage that the frame rate is not reduced.

One of the configuration of the embodiment as shown in FIG. 6, in which the operation condition of the receiver 6 is set, i.e., the sampling time of the signal sampler-and-holder 65 is set; and the configuration of the embodiment as shown in FIG. 9, in which the operation condition of the transmitter 5 is set, i.e., the frequency of the drive signal applied to the transmission electrode 2 is set, may be selected in consideration of a manufacturing cost, and the like. However, a configuration that combines the above two configurations is also possible.

Thus, the touch screen device according to the features of the present invention has an advantageous effect that reduction in detection accuracy of the touch position caused by an influence of exogenous noises can be avoided. Thus, the touch screen device according to the features of the present invention is useful as a touch screen device including a receiver provided with a signal sampler-and-holder. The receiver receives a charge-discharge current signal of the receiving electrode in response to the drive signal applied to the transmission electrode, and outputs a level signal for each electrode intersection. The signal sampler-and-holder samples an integrated signal at a predetermined time.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A touch screen device comprising:
a plurality of first electrodes extending in parallel to each other;
a plurality of second electrodes extending in parallel to each other, the first electrodes and the second electrodes being arranged in a grid pattern;
a transmitter that applies a drive signal to each of the first electrodes;
a receiver that receives a charge-discharge current signal from each of the second electrodes in response to the drive signal applied to each of the first electrodes, and outputs a level signal at each intersection between the first electrodes and the second electrodes; and
a controller that detects a touch position based on the level signal output from the receiver,
wherein the receiver includes an IV converter that converts the charge-discharge current signal into a voltage signal, and
wherein a conversion characteristic of the IV converter is set such that phases of amplitude of the voltage signal corresponding to a leading edge and a trailing edge of a pulse wave of the drive signal substantially match each other, and phases of amplitude of the voltage signal corresponding to the trailing edge of the pulse wave and a leading edge of a succeeding pulse wave substantially match each other.

2. The touch screen device according to claim 1, wherein the IV converter has a conversion circuit and the conversion characteristic is a time constant of the conversion circuit.

3. The touch screen device according to claim 1, wherein the transmitter is configured to switch a frequency of the drive signal among a plurality of frequencies,
the IV converter is configured to switch the conversion characteristic among a plurality of conversion characteristics respectively corresponding to the plurality of frequencies of the drive signal, and the controller controls the IV converter to switch the conversion characteristic in accordance with switching of the frequency of the drive signal.

4. The touch screen device according to claim 3, wherein the controller switches the frequency of the drive signal and the conversion characteristic of the IV converter at a frame period, in which receipt of the charge-discharge current signals for all of the plurality of electrode intersections is completed.

5. The touch screen device according to claim 1, wherein the controller determines whether or not an influence of an exogenous noise is present at a frame period, in which receipt of the charge-discharge current signals for all of the plurality of electrode intersections is completed, and when it is determined that the influence of the exogenous noise is present at the frame period, the controller discards touch position information of the frame period.

6. The touch screen device according to claim 5, wherein the controller determines whether or not the influence of the exogenous noise is present based on a degree of variation in touch positions.

7. The touch screen device according to claim 3, wherein the controller determines whether or not an influence of an exogenous noise is present, and switches the frequency of the drive signal and the conversion characteristic of the IV converter when the influence of the exogenous noise is present.

8. The touch screen device according to claim 7, wherein the controller determines whether or not the influence of the exogenous noise is present based on a degree of variation in touch positions.

9. The touch screen device according to claim 7, wherein the controller determines whether or not the influence of the exogenous noise is present based on stability of the level signal.

10. The touch screen device according to claim 9, wherein the controller determines whether or not the influence of the exogenous noise is present upon start up of the touch screen device.

11. The touch screen device according to claim 10, wherein the controller determines whether or not the influence of the exogenous noise is present during calibration.

12. The touch screen device according to claim 1, further comprising a plurality of switches, each switching an input of the charge-discharge current signal of each of the second electrodes to the receiver, wherein a predetermined number of the second electrodes and a predetermined number of the switches are grouped, and on-off control of corresponding switches included in respective groups is concurrently performed.

13. A touch screen device, comprising:

a plurality of first electrodes extending in parallel to each other;

a plurality of second electrodes extending in parallel to each other, the first electrodes and the second electrodes being arranged in a grid pattern;

a transmitter that applies a drive signal to each of the first electrodes;

a receiver that receives a charge-discharge current signal from each of the second electrodes in response to the drive signal applied to each of the first electrodes, and outputs a level signal at each intersection between the first electrodes and the second electrodes; and a controller that detects a touch position based on the level signal output from the receiver, wherein the receiver rectifies a voltage signal, which is obtained by IV-conversion of the charge-discharge current signal of each of the second electrodes, integrates the rectified signal along a time axis, samples the integrated signal by a signal sampler-and-holder at a sampling time, and outputs a level signal, and wherein the controller obtains the level signal output from the receiver a plurality of times during calibration of the touch screen device, detects a degree of variation in the level signal, determines whether or not the degree of variation is smaller than a reference value, and changes the sampling time of the signal sampler-and-holder when the degree of variation is not smaller than the reference value.

14. The touch screen device according to claim 13, wherein the controller minimizes the degree of variation in the level signal by performing sampling in a vicinity of times at which a cycle of the drive signal and a cycle of the exogenous noise have a common multiple.

15. A touch screen device, comprising:

a plurality of first electrodes extending in parallel to each other;

a plurality of second electrodes extending in parallel to each other, the first electrodes and the second electrodes being arranged in a grid pattern;

a transmitter that applies a drive signal to each of the first electrodes;

a receiver that receives a charge-discharge current signal from each of the second electrodes in response to the drive signal applied to each of the first electrodes, and outputs a level signal at each intersection between the first electrodes and the second electrodes; and a controller that detects a touch position based on the level signal output from the receiver, wherein the receiver rectifies a voltage signal, which is obtained by IV-conversion of the charge-discharge current signal of each of the second electrodes, integrates the rectified signal along a time axis, samples the integrated signal by a signal sampler-and-holder at a sampling time, and outputs a level signal, and wherein the controller obtains the level signal output from the receiver a plurality of times during calibration of the touch screen device, detects a degree of variation in the level signal, determines whether or not the degree of variation is smaller than a reference value, and changes a frequency of the drive signal applied to each of the first electrodes by the transmitter when the degree of variation is not smaller than the reference value.

* * * * *